United States Patent [19]

Lynn

[11] Patent Number: 4,471,924
[45] Date of Patent: Sep. 18, 1984

[54] BLAST DEFLECTING FENCE

[76] Inventor: B. Stanley Lynn, Pajaro Dunes, H-11, Watsonville, Calif. 95076

[21] Appl. No.: 397,474

[22] Filed: Jul. 12, 1982

[51] Int. Cl.³ .............................................. B64F 1/26
[52] U.S. Cl. .............................. 244/114 B; 181/218; 256/12.5
[58] Field of Search ....................... 244/114 R, 114 B; 181/210, 218; 256/12.5, 26, 24, 25, 1, 73

[56] References Cited

U.S. PATENT DOCUMENTS

| | | | |
|---|---|---|---|
| 2,974,910 | 3/1961 | Lynn | 244/114 B |
| 3,007,539 | 11/1961 | Brewer et al. | 244/114 B |
| 3,080,937 | 3/1963 | Garbell | 244/114 B |
| 3,307,809 | 3/1967 | Lynn | 244/114 B |
| 3,386,528 | 6/1968 | Kurtze | 181/218 |
| 3,797,787 | 3/1974 | Watanabe | 244/114 B |

FOREIGN PATENT DOCUMENTS 545515  3/1977  U.S.S.R. ........................ 244/114 B

Primary Examiner—Galen L. Barefoot
Attorney, Agent, or Firm—Flehr, Hohbach, Test, Albritton & Herbert

[57] ABSTRACT

A blast deflecting fence having separate upper and lower deflecting surfaces which overlap. The lower deflecting surface is curved so that a jet blast directed towards it is deflected upwards. The upper deflecting surface is positioned so that lower portion of the upper surface overlaps the upper portion of the lower surface and is horizontally separated therefrom. The upper deflecting surface is inclined between 30° below the vertical and vertical so that jet blasts are directed upwards. End walls are provided perpendicular to the blast fence to constrain the lengthwise flow of exhaust gases.

6 Claims, 3 Drawing Figures

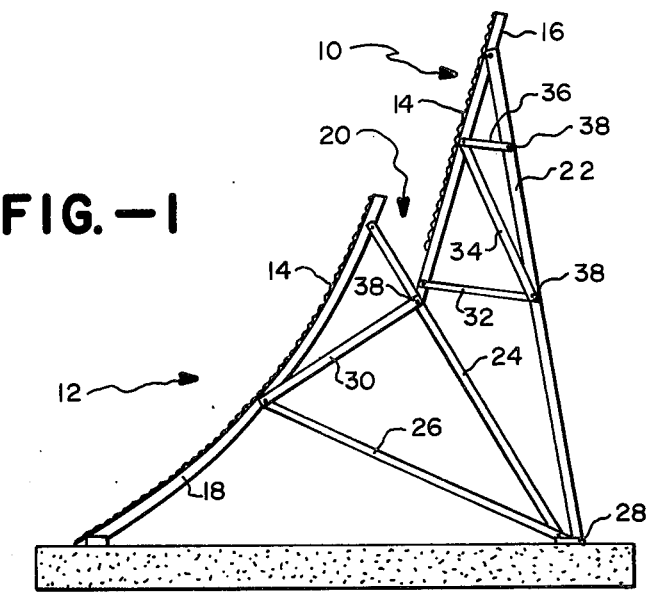
FIG.—1
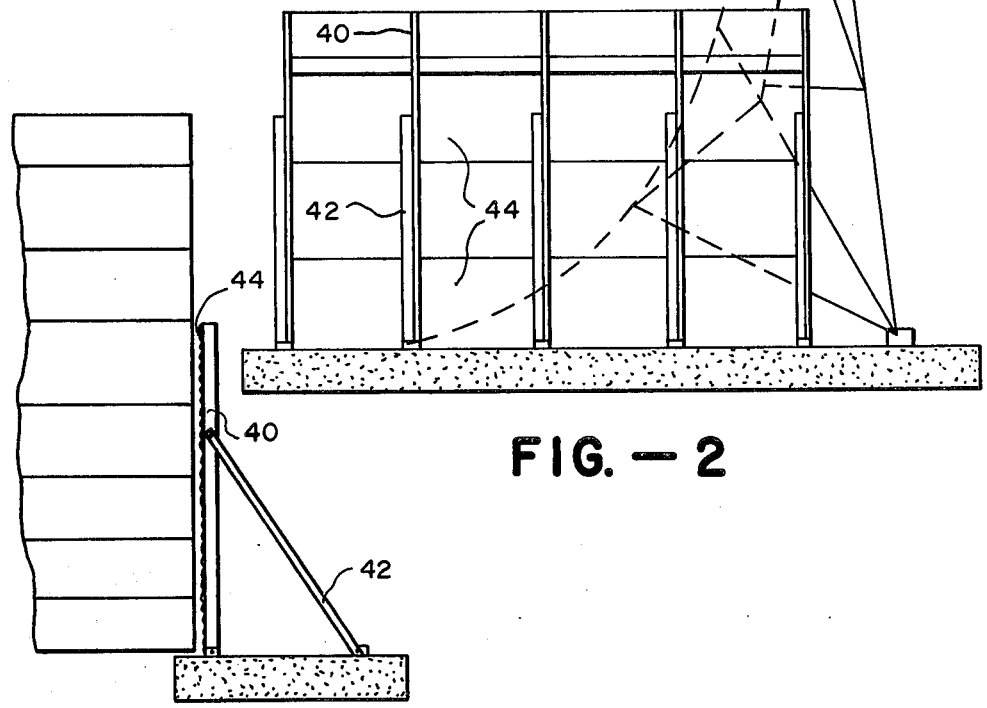
FIG.—2
FIG.—3

BLAST DEFLECTING FENCE

FIELD OF THE INVENTION

The present invention relates to blast deflector fences for upwardly deflecting the jet blasts of various types of aircraft. It is particularly related to deflecting the blasts of modern jet engines which produce gases having very high temperatures, velocities and volumes.

BACKGROUND OF THE INVENTION

It is customary to ground-check the performance of jet engines after over-haul or the replacement of parts. The engines are tested either in the aircraft or on a test stand by running them at full takeoff power. The resulting horizontal jet blast is very powerful and dangerous, and must be deflected to prevent possible injury to mechanics and buildings in the immediate vicinity. The blast deflectors and fences of the prior art (see for example U.S. Pat. Nos. 2,974,910, and 3,126,176) tend to suck up the ambient air behind the deflector or fence, causing notable turbulence and reverse flow. The temperatures, velocities and volumes of exhaust gases from the newer jet engines far exceed those for which the previously designed blast deflectors were intended. The greatest single problem with the prior art structures is turbulene behind the deflector. Turbulence is greatly magnified in the prior art blast fences by the spanwise flow of the high velocity gases, which swirl off the ends of the fence into the low pressure area behind the structure. This in turn forms vortices having extreme turbulence even when the small end plates shown in the prior art patents are used. These turbulent gases are very dangerous because of their temperature, velocity and the fumes which they carry.

In addition to the unsatisfactory aerodynamic performance of the prior art patents as noted above, the effective life of these blast fences is relatively short. This is because the extreme high temperature and high velocity of after burner blasts produced by military jets on take-off tend to overheat the deflecting surface and the high blast velocity creates a high pressure which causes the sheets to deform. These deformed sheets require maintenance and early replacement.

The improvement embodied by the present invention alleviates these problems. The low pressure area behind the deflector is virtually eliminated. By eliminating this low pressure area, vortices and turbulence and reverse flow are reduced. With the addition of the herein disclosed end closures, protection from jet blast is so complete that it is possible to stand behind or to the side of the improved deflector and touch the structure with no discomfort.

BRIEF DESCRIPTION OF THE INVENTION AND OBJECTS

The blast deflector fence of the present invention is comprised of forming an overlapping shielded slot between the upper deflecting surface and the curved lower deflecting surface of a blast fence and the addition of end closures, perpendicular to said surfaces. The upper deflecting surface is flat and is vertical or inclined 30° below vertical. The lower deflecting surface is concave, thereby directing the jet blast upward. A shielded slot is formed between the upper deflecting surface and the curved lower deflecting surface by extending the upper deflecting surface below the top of the lower deflecting surface and providing a horizontal displacement between the two. The lower surface is closer to the origin of the blast than the upper surface. Bracing and anchoring means are provided so that the blast fence may be firmly installed. End walls, perpendicular to the blast fence are installed at each end of said fence and are preferably at least sixty percent of the height of the blast fence.

Accordingly, it is an object of the present invention to provide an improved blast deflector fence particularly suited for use in conjunction with high thrust, high temperature jet engines.

Another object of the present invention is to provide a blast deflector fence which produces little or no turbulence behind it.

A still further objective is to provide a blast deflector fence having a long life.

Additional objects will become apparent to those skilled in the art.

A BRIEF DESCRIPTION OF THE DRAWINGS

FIG. 1 is an end view of the preferred embodiment of the present invention.

FIG. 2 is an end view of the preferred embodiment of the present invention showing the end wall of the present invention.

FIG. 3 is a side sectional view of the end wall of the present invention.

DESCRIPTION OF A PREFERRED EMBODIMENT

Referring first to FIG. 1, the blast deflector fence of the present invention is comprised of an upper deflecting surface 10 separated from a curved lower deflecting surface 12. The upper deflecting surface is flat and may range from vertical to 30° below the vertical. Preferably the upper surface is between 10° to 15° below the vertical and inclined so that an impinging blast is deflected upwards. These surfaces are made of corrugated metal sheets disposed over a metal framework. Preferably these sheets should be doubled sheets in the area of direct blast impingement. In the preferred embodiment, structural steel channels 16 and 18 will support corrugated steel sheets 14. These corrugated sheets or panels are attached by attachment means to the steel support channels, preferably by means of nuts and bolts. A slot 20, is left between the upper and lower surfaces. This slot may be between six and twenty-four inches in width, though preferably between sixteen and twenty inches in width. The slot is not easily discernible from either front or rear views because of the screening overlap. If the overlapping of the upper and lower surfaces is insufficient, the hot blast which the fence is meant to deflect, would be able to pass through the fence. If the upper deflecting surface extends too far below the top of the lower deflecting surface, there would be a waste of material. Preferably, the upper deflecting surface should extend between one and two feet below the top of the lower deflecting surface.

Supporting structures must be supplied to maintain the structural integrity of the present invention; in addition, the fence itself must be firmly anchored.

Struts 22, 24 and 26 are anchored to an anchor pad 28 which is firmly secured to the ground. Rear strut 22 runs from the foot of the anchor to just below the top of the upper deflecting surface. Top strut 24 runs from the anchor to just below the top of the lower deflecting surface, and is attached to the bottom of the upper deflecting surface. Bottom strut 26 is attached at one end at the anchor and at the other end to the approximate midpoint of lower rib 18. The supporting struts are then braced with web braces 30, 32, 34, and 36. Bottom web brace 30 is attached at one end to both the steel support channel of the lower deflecting surface 18 and bottom strut 26; and at the other end to the bottom of the upper deflecting surface, where top strut 24 meets the bottom of the upper deflecting surface. Middle web brace 32 is attached at one end to just above the bottom of the upper deflecting surface and at the other end to rear strut 22 and upper web brace 34. Upper web brace 34 runs from the junction of middle web brace 32 and the rear strut 22 to the mid point of the steel support channel of the upper deflecting surface. Top web brace 36 is attached at one end to both the mid point of the steel support channel for the upper deflecting surface and one end of the upper web brace, and at the other end to the rear strut. Horizontal stringers 38 run between the rib frames hereinabove described and are themselves braced with diagonal braces. Preferred spacing between rib frames is approximately two feet apart in areas subject to the greatest part of the blast force. Spacing between rib frames may be increased to three or four feet in those areas of the fence which are not exposed to substantial blasts.

In the preferred embodiment of the present invention, end walls or end closures are used to block off the ends of the blast fence in order to prevent the lateral flow of gases, which would form turbulent vortices behind the ends of the fence. End walls are essential to the satisfactory performance of short blast fences, i.e. those under one hundred feet in length. These end walls should be perpendicular to the blast fence and are illustrated in FIGS. 2 and 3. The end wall should be at least as tall as the top of the lower deflecting surface and should extend behind the front of the upper deflecting surface. Vertical steel channels 40 are firmly anchored to the ground. Knee braces 42 are attached near the top end of vertical steel channel 40 and are anchored at the other end. Corrugated steel sheets 44 form the surface of the end wall. In the preferred embodiment, the end wall should have a height of approximately eight feet where the blast fence has a height of twelve feet and a height of six feet when the blast fence is eight feet tall. It has been found that a twelve foot long end wall is suitable for most purposes. Preferably the end wall should extend at least one foot forward of the frontmost edge of the lower deflecting surface.

The height of the blast fence hereinabove disclosed may range between eight feet and twenty feet, depending upon the application. The invention may be used to screen maintenance areas where engine checks are performed or to screen structures from blasts at large commercial airports. Depending upon the amount of protection desired and types of aircraft, the blast fence may be as short as twenty feet or as long as several hundred feet.

What is claimed is:

1. A blast deflecting fence, comprising a lower deflecting surface and an upper deflecting surface, braced by bracing means and anchored to a foundation, said lower deflecting surface being curved whereby a jet blast directed against said lower deflecting surface is deflected upwardly, said upper deflecting surface being uniformly flat and inclined between 30° below vertical and vertical, said upper deflecting surface being spaced apart from said lower deflecting surface, the upper edge of the lower deflecting surface overlapping the lower edge of the upper deflecting surface to thereby shield said bracing means, said upper edge of the lower deflecting surface being horizontally separated from said lower edge of the upper deflecting surface by a distance of not less than six inches and not more than thirty inches.

2. The blast fence of claim 1 wherein said upper and lower deflecting surfaces are comprised of corrugated sheet metal.

3. The blast fence of claim 1 wherein said bracing means comprise supporting struts attached to said upper and lower deflecting surfaces.

4. The blast fence of claim 1 wherein said upper and lower deflecting surfaces are comprised of doubled sheets of corrugated sheet metal.

5. The blast fence of claim 1 wherein said upper deflecting surface is inclined between 10° and 15° below the vertical.

6. A blast deflecting fence, comprising a lower deflecting surface and an upper deflecting surface braced by bracing means and anchored to a foundation, said lower deflecting surface being curved wherein a jet blast directed against said lower deflecting surface is deflected upwardly, said upper deflecting surface being uniformly flat and inclined between 30° below the vertical and vertical, said upper deflecting surface being spaced apart from and rearward of said lower deflecting surface, the upper edge of the lower deflecting surface overlapping the lower edge of the upper deflecting surface to thereby shield said bracing means, said upper edge of the lower deflecting surface being horizontally separated from said lower edge of the upper deflecting surface by a distance of not less than six inches and not more than thirty inches, and detached end walls disposed at the terminal ends of said blast deflecting fence and perpendicular thereto.

* * * * *